(12) United States Patent
Zampiello et al.

(10) Patent No.: US 8,166,521 B2
(45) Date of Patent: Apr. 24, 2012

(54) APPARATUS AND METHOD FOR MONITORING COMMUNICATIONS

(75) Inventors: Geoffrey Zampiello, Norwalk, CT (US); Jonathan Martin, Middletown, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1021 days.

(21) Appl. No.: 11/848,365

(22) Filed: Aug. 31, 2007

(65) Prior Publication Data

US 2009/0064313 A1 Mar. 5, 2009

(51) Int. Cl.
*H04L 29/06* (2006.01)
(52) U.S. Cl. .................. 726/4; 726/11; 726/17; 726/22; 370/328; 370/360; 370/401
(58) Field of Classification Search .............. 726/4, 17, 726/22; 370/328, 401, 360
See application file for complete search history.

(56) References Cited

U.S. PATENT DOCUMENTS

| | | | |
|---|---|---|---|
| 7,586,871 B2 * | 9/2009 | Hamilton et al. ............. | 370/328 |
| 2006/0174028 A1 | 8/2006 | Zhu | |
| 2007/0143858 A1 | 6/2007 | Hearty | |
| 2007/0177615 A1 * | 8/2007 | Miliefsky ...................... | 370/401 |
| 2009/0041011 A1 * | 2/2009 | Sheppard ...................... | 370/360 |

FOREIGN PATENT DOCUMENTS

WO WO 2010088963 A1 * 8/2010

OTHER PUBLICATIONS

Tao Peng, Christopher Leckie, Kotagiri Ramamohanarao, "Survey of network-based defense mechanisms countering the DoS and DDoS problems", Apr. 2007, Computing Surveys (CSUR), vol. 39 Issue 1, Publisher: ACM, pp. 1-42.*

* cited by examiner

*Primary Examiner* — Michael Pyzocha
*Assistant Examiner* — Courtney Fields
(74) *Attorney, Agent, or Firm* — Guntin Meles & Gust, PLC; Pablo Meles (57) ABSTRACT

A system that incorporates teachings of the present disclosure may include, for example, a server having a controller to transmit a tracking request to a session information retriever for a targeted user of a network with the session information retriever storing session information for users of the network and with the tracking request having identification information associated with the targeted user, transmit a query to the session information retriever for relevant session information associated with the targeted user with the relevant session information being selected by the session information retriever from the session information based at least in part on the identification information associated with the targeted user and with the relevant session information being stored in a single file associated with the targeted user, and receive at least a portion of the relevant session information transmitted from the session information retriever. Other embodiments are disclosed.

22 Claims, 6 Drawing Sheets

APPARATUS AND METHOD FOR MONITORING COMMUNICATIONS

FIELD OF THE DISCLOSURE

The present disclosure relates generally to communication services and more specifically to an apparatus and method for monitoring communications.

BACKGROUND

It is often desirable to track a user's or subscriber's activity within a network, such as for law enforcement purposes or for commercial or other benefits. However, tracking of the activity can be a labor intensive and difficult process. A user's IP address can change when the subject disconnects a session or re-establishes a session. A single user requesting the same class of service may appear across multiple endpoints of the network, and the request for the same class of service can occur simultaneously.

DETAILED DESCRIPTION

In one embodiment of the present disclosure, a computer-readable storage medium can have computer instructions for obtaining session information from a user information server where the session information is associated with users of a network, storing the session information, receiving a tracking request for a targeted user among the users of the network, selecting relevant session information from the session information where the relevant session information is associated with the targeted user and is selected based at least on identification information associated with the targeted user, and storing the relevant session information in a flat file.

In one embodiment of the present disclosure, a server can have a controller to store session information associated with access to a network, receive a tracking request from a mediation device for a targeted user of the network, select relevant session information from the session information where the relevant session information is associated with the targeted user, and transmit the relevant session information to the mediation device in response to queries from the mediation device where the queries are at configurable intervals.

In one embodiment of the present disclosure, a server can have a controller to transmit a tracking request to a session information retriever for a targeted user of a network where the session information retriever stores session information for users of the network and where the tracking request comprises identification information associated with the targeted user, transmit a query to the session information retriever for relevant session information associated with the targeted user where the relevant session information is selected by the session information retriever from the session information based at least in part on the identification information associated with the targeted user where the relevant session information being stored in a single file associated with the targeted user, and to receive at least a portion of the relevant session information transmitted from the session information retriever.

In one embodiment of the present disclosure, a network device can have a controller to transmit relevant session information to a mediation device in response to a tracking request, where the relevant session information is associated with a targeted user among users of a network and is retrieved from stored session information of the users based on the tracking request, and where the relevant session information is stored in a flat file associated with the targeted user.

In one embodiment of the present disclosure, a method can involve obtaining session information from a user information server where the session information is associated with users of a network, receiving a tracking request from a mediation device for a targeted user among the users of the network, selecting relevant session information from the session information where the relevant session information is associated with the targeted user and is selected based at least on user identification information in the tracking request, and storing the relevant session information in a flat file.

Figure 1:
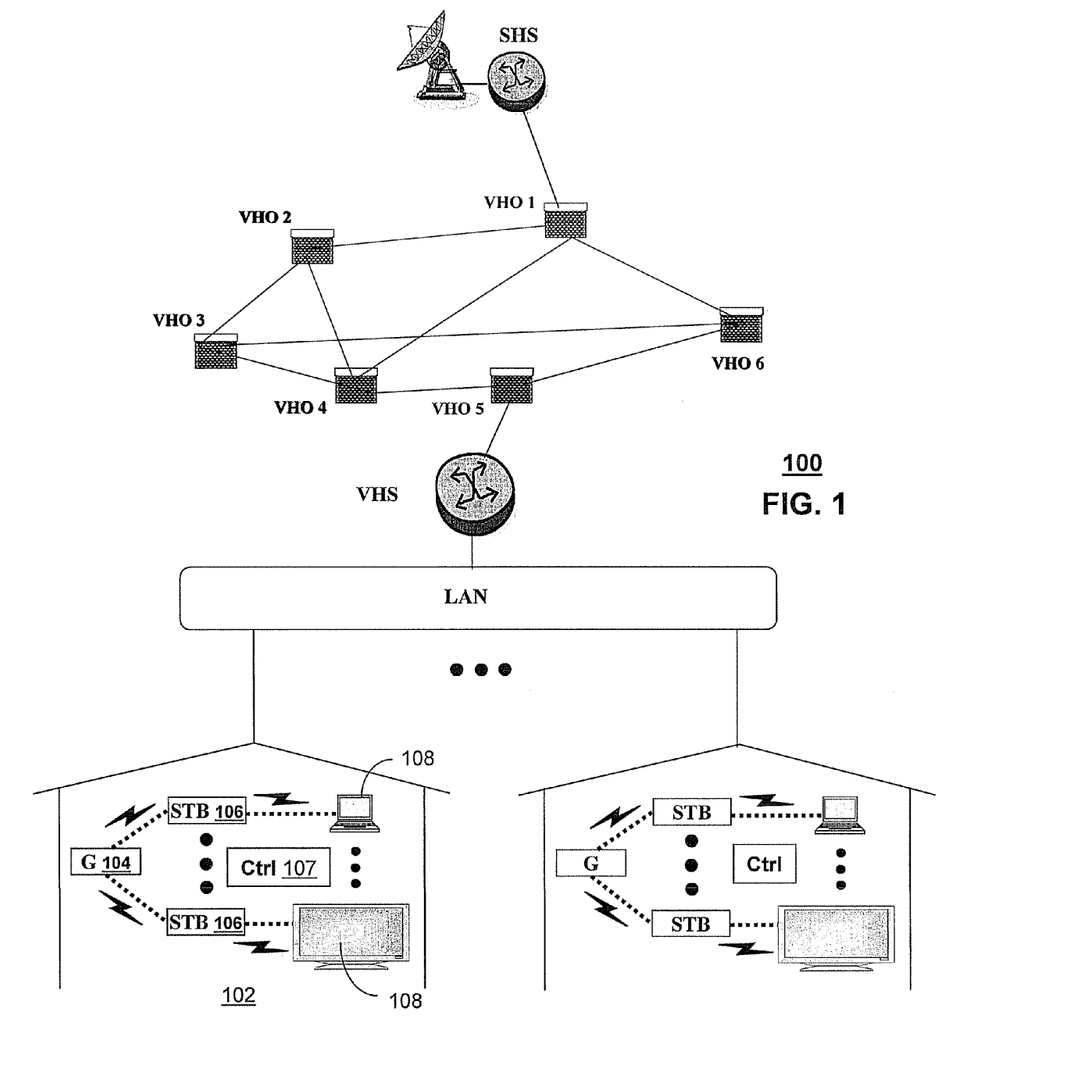
FIGS. 1-4 depict exemplary embodiments of a communication system.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
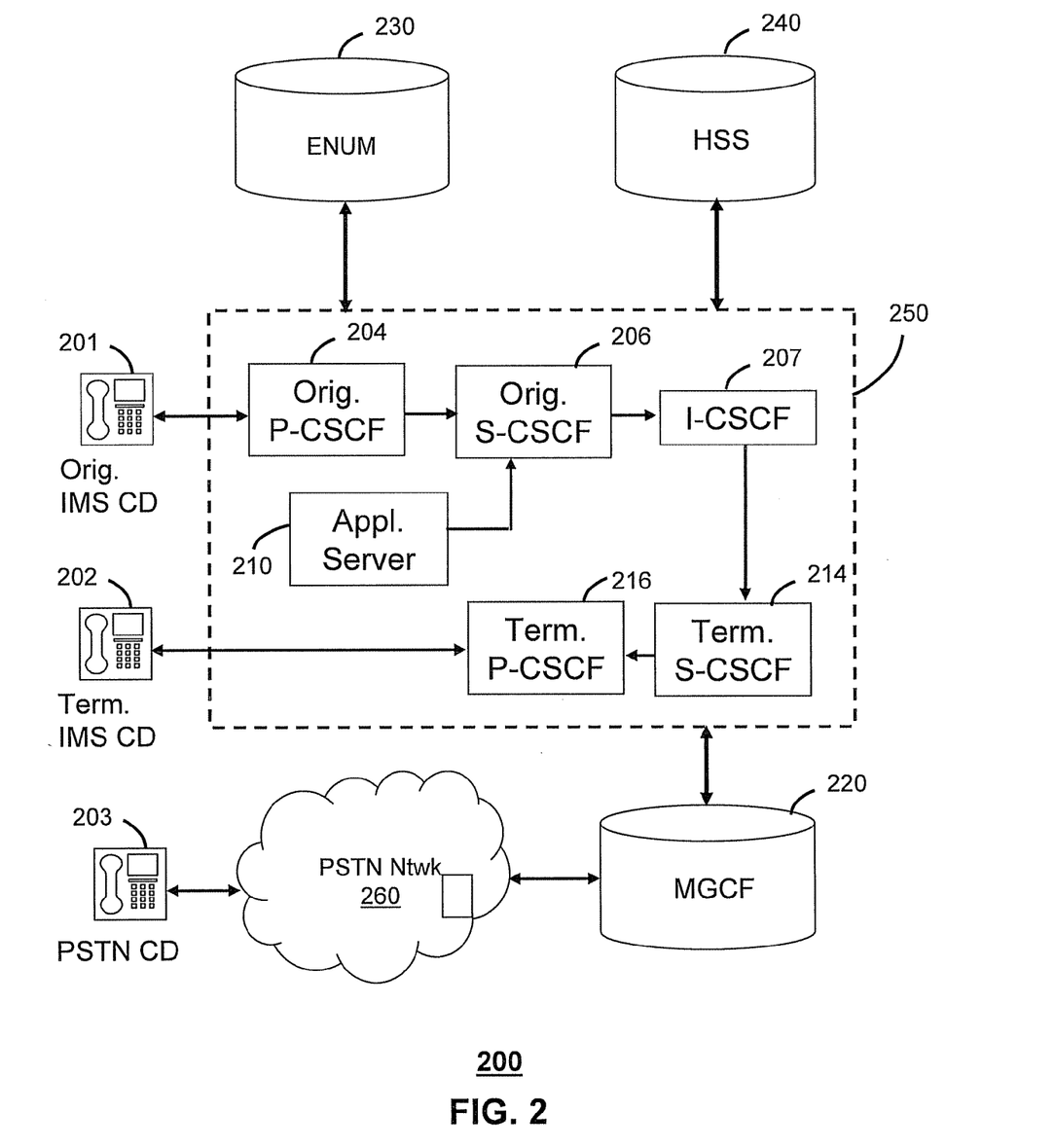

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
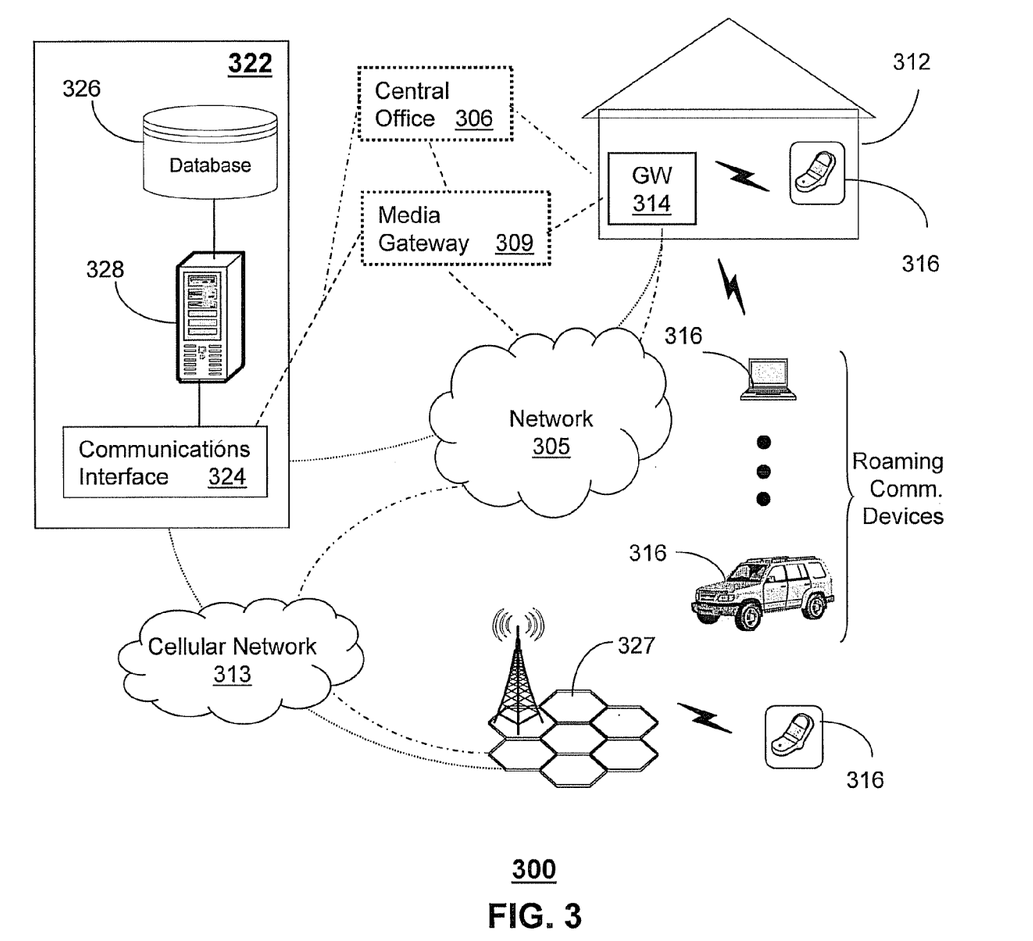

FIG. 3 depicts an exemplary embodiment of a communication system 300 employing fixed and/or mobile communication devices 316 communicating by way of wireless access points (WAPs) and/or wired infrastructure with other communication devices and/or a network proxy or web server 322, which collectively operate in the communication system 300. Communication system 300 can be overlaid or operably coupled with communication systems 100 and/or 200 as another representative embodiment of the communication system.

The communication device 316 can be a multimode communication device, such as a multimode VoIP terminal. However, the present disclosure contemplates the use of other types of communication devices, including other types of voice, video and data devices. The communication system 300 can comprise a packet-switched network 305. The packet-switched network can be an Internet Service Provider (ISP) network 305. The network 305 can be coupled to the network proxy 322, the cellular network 313 and network elements located in one or more of the buildings 312 representing an enterprise or residence. The ISP network 305 utilizes technology for transporting Internet traffic.

In an enterprise setting, the building 312 can include a gateway 314 that provides voice and/or video connectivity services between communication devices 316, such as VoIP terminals or other forms of communication devices of enterprise personnel. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306 and the gateway 314. Communications between the network proxy 322, the communication devices 316 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 314. By way of the communications interface 324, the network proxy 322 can direct by common means any of the foregoing network elements to establish packet switched data, voice, and/or video connections between communication devices 316 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for communication devices 316, including VoIP terminals.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can Support voice and data services over a number of access technologies such as GSM-GPRS, EDGE, CDMA-IX, UMTS, WiMAX, software defined radio (SDR), and other known and future technologies. The cellular network 313 can be coupled to base stations 327 under a frequency-reuse plan for communicating over-the-air with roaming VoIP terminals 316.

Figure 4:
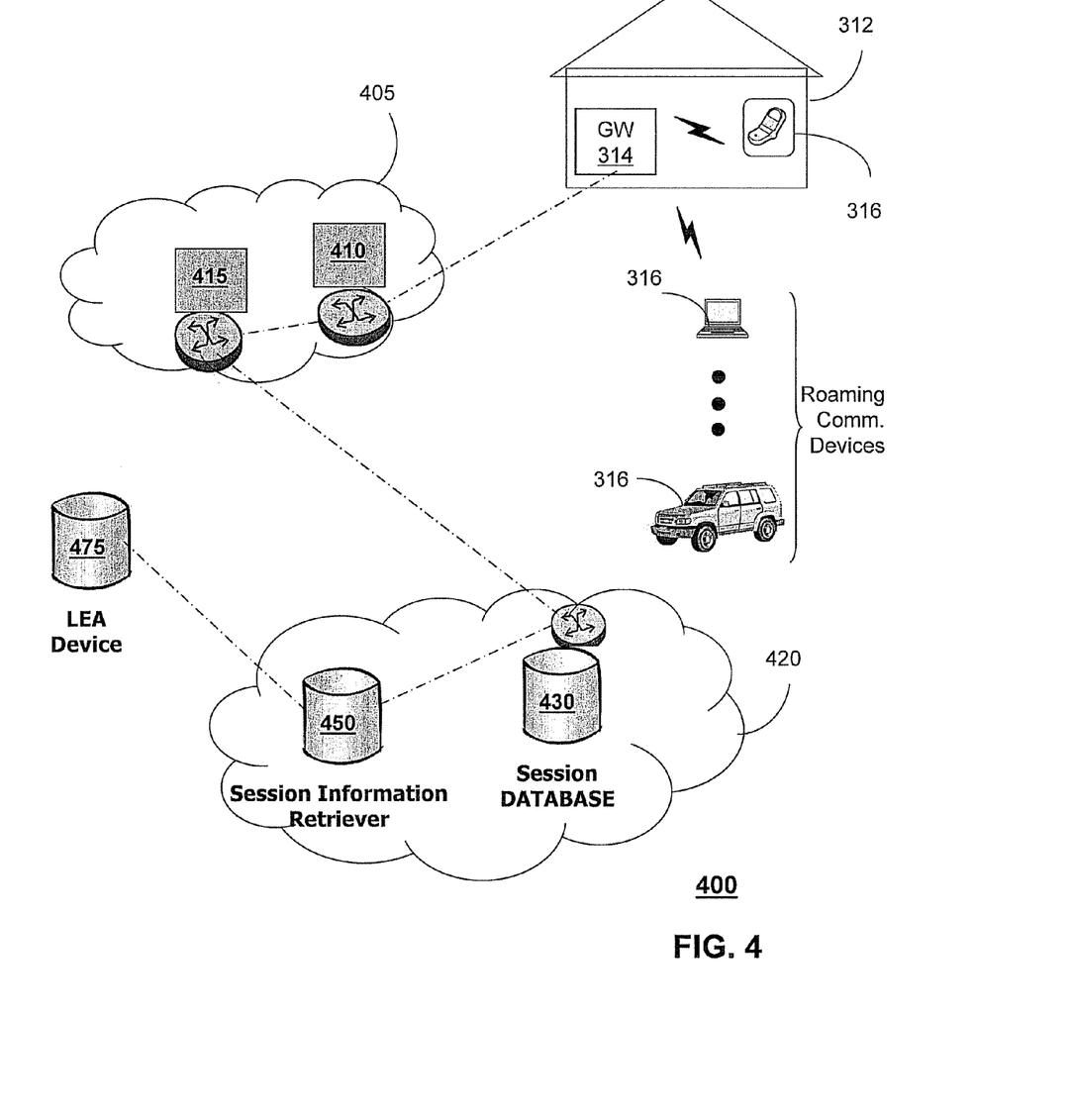

FIG. 4 depicts an exemplary embodiment of a communication system 400 employing fixed and/or mobile communication devices 316 communicating by way of wireless access points (WAPs) and/or wired infrastructure with other communication devices of a network 405 through use of one or more network access servers (NASs) 410, such as a Broadband Remote Access Server (BRAS). Communication system 400 can be overlaid or operably coupled with communication systems 100, 200 and/or 300 as another representative embodiment of the communication system.

NAS 410 can include various components and can utilize various protocols, such as Point-to-Point Protocol (PPP), to communicate with, and provide network access to, the communication devices 316. NAS 410 can aggregate traffic from a number of access nodes throughout the network 405, such as Digital Subscriber Line Access Multiplexers (DSLAMs).

NAS 410 can communicate with a user information server (UIS) or database 415, such as a Remote Authentication Dial In User Service (RADIUS) server, for authentication, authorization and/or accounting (AAA) services related to the network access to be provided to each of the communication devices 316. For example, the NAS server 410 can communicate to the UIS 415 any identification information related to the communication device 316 that is requesting access to the network 405. Various protocols can be utilized for the communication of the identification information, such as the RADIUS protocol. The UIS 415 can authenticate the communication device 316 based upon a number of authentication schemes, such as Password Authentication Protocol (PAP), Challenge-Handshake Authentication Protocol (CHAP) or Extensible Authentication Protocol (EAP).

UIS 415 can retrieve and maintain other information related to the communication device 316, such as a session's start and/or end time, the number of packets transferred during the session, the volume of data transferred during the session, and the reason for the session ending. In one embodiment, the UIS 415 can be a RADIUS server that can be used by VoIP service providers, such as for transmitting login credentials of a SIP end point (e.g., a broadband phone) to a SIP Registrar using digest authentication, and then to the RADIUS server using RADIUS protocol.

Communication system 400 can include a session information retrieval system 420, which has a session information database 430 and a session information retriever 450. The session information retrieval system 420 can be remotely positioned from the NAS 410 and/or the UIS 415. However, the present disclosure also contemplates the session information retrieval system 420 being incorporated into one or both of the NAS 410 and/or the UIS 415, including sharing one or more components with the NAS and/or UIS. The session information database 430 and session information retriever 450 can include various components (e.g., controller, communication interface, and memory), and can utilize various protocols to communicate with the UIS 415, as well as with one or more mediation devices 475, such as a Law Enforcement Agency (LEA) device or server.

Figure 5:
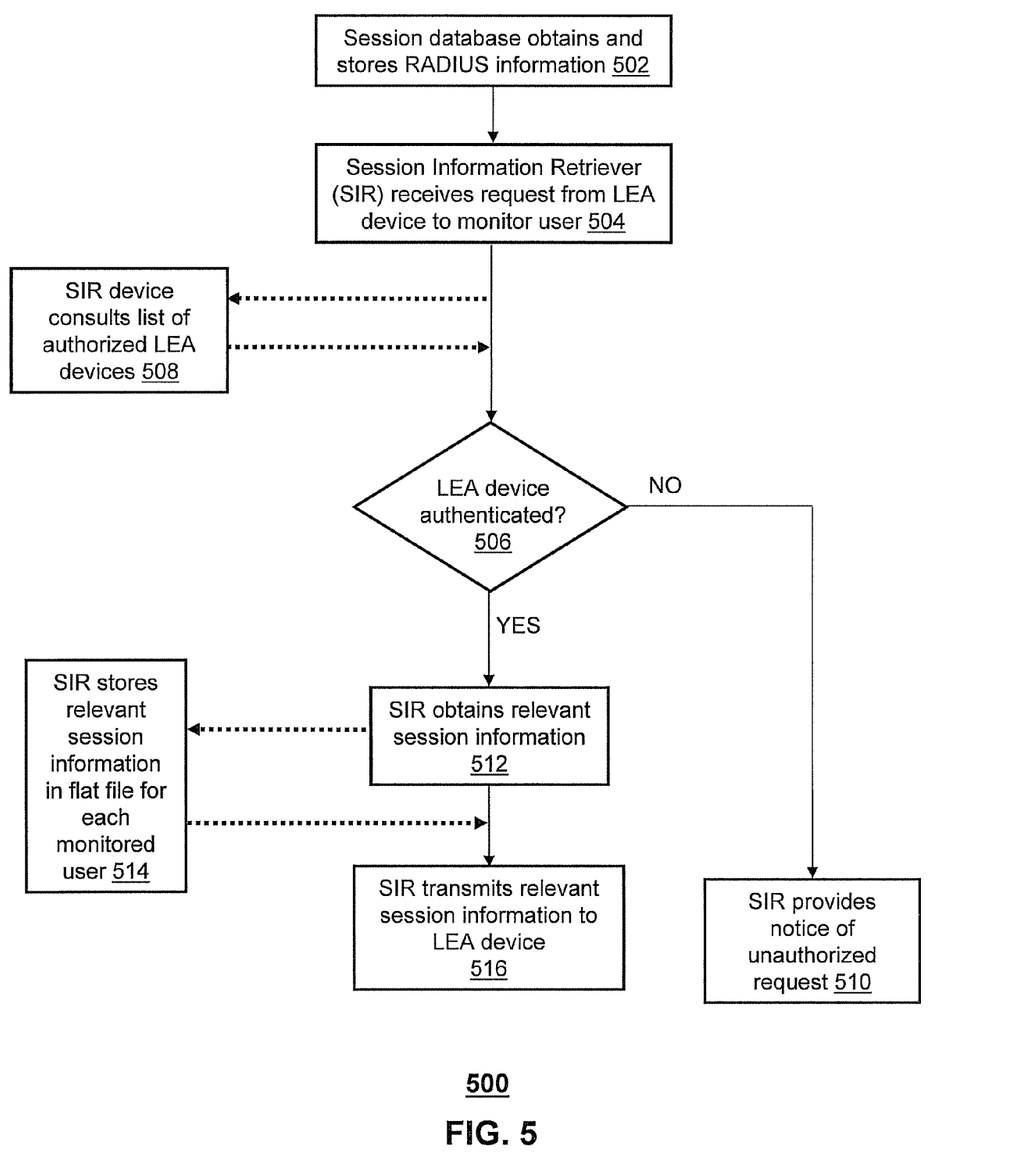
FIG. 5 depicts an exemplary method operating in portions of the communication systems.

FIG. 5 depicts an exemplary method 500 operating in portions of the communication systems 100-400. Method 500 has variants as depicted by the dashed lines. It would be apparent to an artisan with ordinary skill in the art that other embodiments not depicted in FIG. 5 are possible without departing from the scope of the claims described below. For convenience, reference to one or more features of communication system 400 as used in the following paragraphs can mean one or more features of the communication systems 100, 200, 300 and 400 singly or in combination, including network 305, 315, 405 or communication devices 201, 202, 203 and 316, singly or in combination.

Method 500 begins with step 502 in which the session database 430 can obtain and store user information (e.g., RADIUS information) associated with access to network 405 by any communication devices 316. For example, a RADIUS server can transmit RADIUS information to the session database 430 when the RADIUS information is being sent to the NAS 410. The RADIUS information can be maintained by the session database 430 for a specified period of time and then deleted to free up memory for other RADIUS information. The particular time period for retaining the RADIUS information can vary, and can include archiving into another memory device.

In step 504, the session information retriever 450 can receive a request from the LEA device 475 or other mediation device to track session information associated with a particular user or subscriber. In step 506, the session information retriever 450 can determine whether the tracking request is authentic. For example, the session information retriever 450 can be provided with a list of authorized LEA devices 475 that are permitted to make tracking requests as in step 508. The list of authorized LEA devices 475 or other mediation devices can be stored by the session information retriever 450 and periodically updated.

If the tracking request from the LEA device 475 is not authentic, then in step 510 an alert or other notification can be provided by the session information retriever 450, such as an email message to the administrator of the session information retrieval system 420. If on the other hand, the tracking request is authentic, then in step 512 the session information retriever 450 can obtain session information relevant to the tracking request.

The relevant session information for a particular user can be based upon a number of user or usage criteria, including a user identification, an IP address, a MAC address, session start time, session end time, and so forth, which can be included in the tracking request or which can be determined based upon user information included in the tracking request. In one embodiment, the session information retriever 450 upon receipt of a tracking request can create a targeted user file, such as a flat file providing sequential access to the records stored therein, for storage of the relevant session information for a particular user, as in step 514.

In another embodiment, the targeted user file can be a flat file having a single record type, although the present disclosure contemplates the use of multiple record types being stored in the flat file. The targeted user file can provide for consolidation of relevant session information for the user into a file based on a single attribute. For example, the targeted user file can consolidate all relevant session information for the user based on a MAC address so as to uniquely identify a particular machine using the network. As another example, the targeted user file can consolidate all relevant session information for the user so as to monitor the user's activity from a particular location, such as based upon a residential gateway identification.

In step 516, the session information retriever 450 can transmit the relevant session information to the LEA device 475. In one embodiment, the LEA device 475 can query the session information retriever 450 for the relevant session information, such as at configurable or adjustable intervals. In response to the query, the session information retriever 450 can transmit the relevant session information or a portion thereof for that particular user, to the LEA device 475 or otherwise provide access to the relevant session information. For example, the session information retriever 450 can maintain the last known IP address of the subscriber in the targeted user file based upon a tracking request that identifies a subscriber identity. Various relevant session information can be maintained and transmitted to the LEA device 475 to allow for determination of whether the target is currently on line; when was the last active session of the target; what is the Current IP address of the target; and what was the IP address of the target for each of the saved sessions.

The session information retriever 450 can also provide the LEA device 475 with information associated with access attempts, access accepts, access failures, and access session ends. In one embodiment, the session information retriever 450 can transmit the targeted user file to the LEA device 475 so that the LEA device can review all of the relevant session information. The session information retriever 450 can continue to obtain the relevant session information and store it in the targeted user file until receipt of a request to cease tracking the particular user.

Upon reviewing the aforementioned embodiments, it would be evident to an artisan with ordinary skill in the art that said embodiments can be modified, reduced, or enhanced without departing from the scope and spirit of the claims described below. For example, the targeted user file can maintain relevant session information for a targeted user that is retrieved from the session information database 430 based upon a first criteria or set of criteria, and the session information retriever 450 can transmit to the LEA device 475 filtered relevant session information based upon a second criteria or set of criteria. In another example, the session information retriever 450 can generate a number of targeted user files for a particular subscriber which each contain relevant session information that was each retrieved from the session information database 430 based upon different criteria. The session information retriever 450 can provide relevant session information to devices other than the requesting device. For example, the session information retriever 450 can communicate relevant session information or a portion thereof to a complimentary system, such as a tracking system of a different service provider. The LEA device 475 or other mediation device can use the relevant session information for various purposes, such as the application of a filter to the current IP address of the user or for presence monitoring.

These are but a few examples of modifications that can be applied to the present disclosure without departing from the scope of the claims. Accordingly, the reader is directed to the claims section for a fuller understanding of the breadth and scope of the present disclosure.

Figure 6:
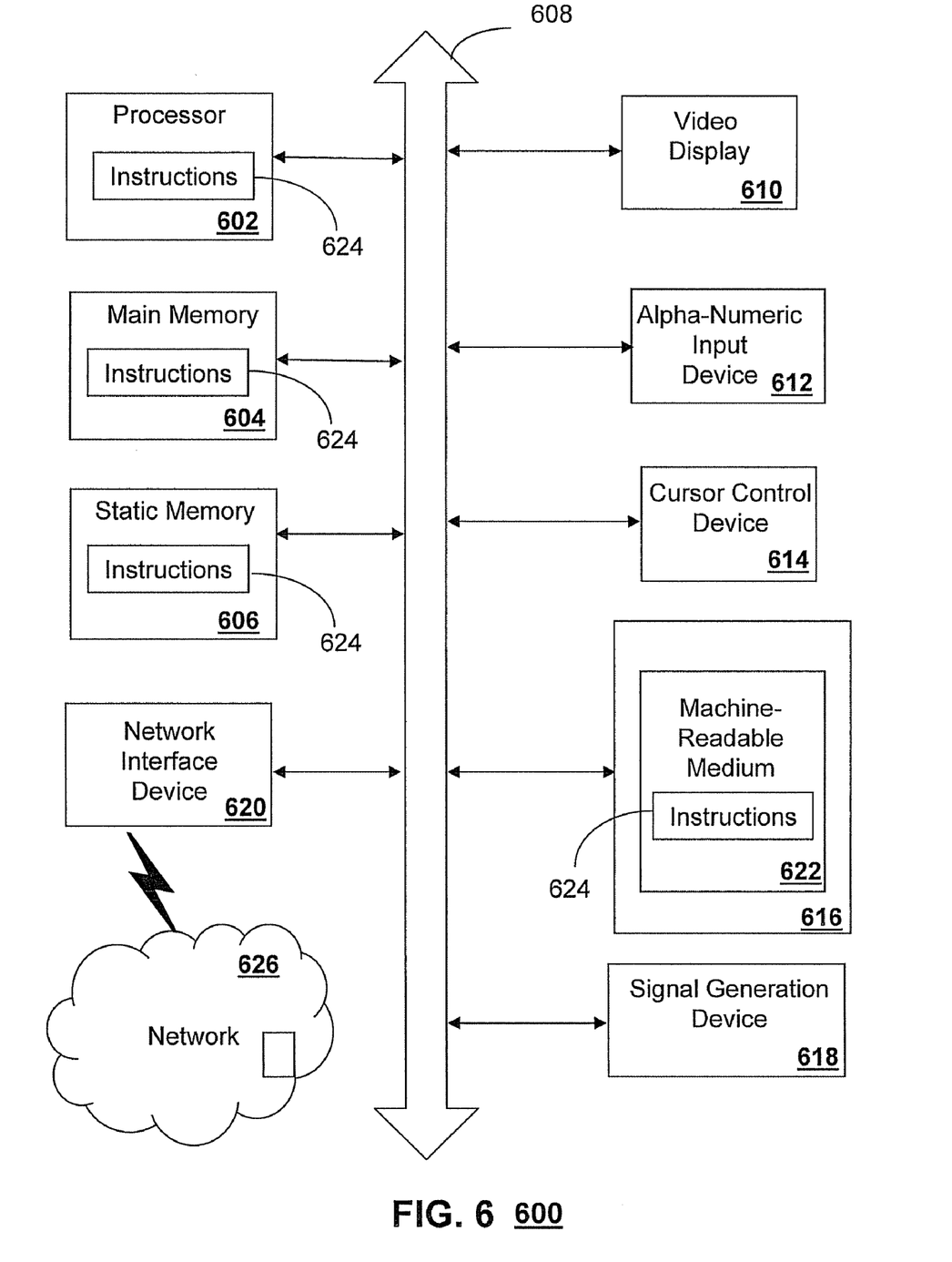
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a mass storage medium 616, a signal generation device 618 (e.g., a speaker or remote control) and a network interface device 620.

The mass storage medium 616 may include a computer-readable storage medium 622 on which is stored one or more sets of instructions (e.g., software 624) embodying any one or more of the methodologies or functions described herein, including those methods illustrated above. The computer-readable storage medium 622 can be an electromechanical medium such as a common disk drive, or a mass storage medium with no moving parts such as Flash or like non-volatile memories. The instructions 624 may also reside, completely or at least partially, within the main memory 604, the static memory 606, and/or within the processor 602 during execution thereof by the computer system 600. The main memory 604 and the processor 602 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the computer-readable storage medium 622 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions that, when executed by one or more processors, cause the one or more processors to perform operations comprising:
   obtaining session information from a user information server, the session information being associated with equipment of users of a network;
   storing the session information;
   receiving a tracking request for a targeted user among the equipment of users of the network;
   authenticating that the tracking request came from an authorized mediation device permitted to make tracking requests based on a comparison with a stored list of authorized mediation devices;
   responsive to the tracking request coming from the authorized mediation device, selecting relevant session information from the session information, the relevant session information being associated with equipment of the targeted user and being selected based at least on identification information associated with the targeted user;
   storing the relevant session information in a flat file;
   transmitting the flat file to the authorized mediation device in response to a query of a plurality of queries where each query is received at a configurable interval from the authorized mediation device
   transmitting a portion of the relevant session information in the flat file to the authorized mediation device.

2. The non-transitory computer-readable storage medium of claim 1, wherein the relevant session information is at least one among an IP address, an access attempt, an access accept, an access failed, or an access session end.

3. The non-transitory computer-readable storage medium of claim 1, wherein the tracking request is received from the authorized mediation device.

4. The non-transitory computer-readable storage medium of claim 1, wherein the tracking request is authenticated based on a stored list of authorized law enforcement agency devices serving as the authorized mediation devices.

5. The non-transitory computer-readable storage medium of claim 1, comprising computer instructions that, when executed by one or more processors, cause the one or more processors to perform operations comprising providing the authorized mediation device with access to the flat file.

6. The non-transitory computer-readable storage medium of claim 1, wherein the portion of the relevant information is sent to the authorized mediation device in response to a query from the authorized mediation device.

7. A server, comprising:
   a memory;
   a controller coupled to the memory storing computer instructions when executed by the controller, causes the controller to:
   store session information associated with access to a network;
   receive a tracking request from a mediation device for a targeted user of the network;
   determine if the tracking request came from an authorized mediation device by comparing the mediation device with a list of authorized mediation devices;
   if the tracking request came from the authorized mediation device, then select relevant session information from the session information, the relevant session information being associated with the targeted user; and transmit the relevant session information to the mediation device in response to queries from the mediation device, wherein the queries are received at configurable intervals.

8. The server of claim 7, wherein the controller is adapted to store the relevant session information in a flat file.

9. The server of claim 8, wherein the controller is adapted to transmit the flat file to the authorized mediation device.

10. The server of claim 8, wherein the relevant session information is at least one among an IP address, an access attempt, an access accept, an access failed, and an access session end.

11. The server of claim 7, wherein the controller is adapted to transmit a filtered portion of the relevant session information to the authorized mediation device.

12. A server, comprising:
a memory;
a controller coupled to the memory storing computer instructions that, when executed by the controller, causes the controller to:
  transmit a tracking request to a session information retriever for a targeted user of a network, the session information retriever storing session information for users of the network, the tracking request comprising identification information associated with the targeted user;
  transmit a plurality of queries at a configurable interval to the session information retriever for relevant session information associated with the targeted user, the relevant session information being selected by the session information retriever from the session information based at least in part on the identification information associated with the targeted user, the relevant session information being stored in a single file associated with the targeted user; and
  if the session information retriever determines that the tracking request is made from an authorized law enforcement device, then receive at least a portion of the relevant session information transmitted from the session information retriever.

13. The server of claim 12, wherein the session information retriever obtains the session information from a Remote Authentication Dial In User Service server.

14. The server of claim 13, wherein the file is a flat file.

15. The server of claim 14, wherein the controller is adapted to receive the flat file from the session information retriever.

16. The server of claim 12, wherein the relevant session information is at least one among an IP address, an access attempt, an access accept, an access failed, and an access session end.

17. A network device, comprising:
a memory;
a controller coupled to the memory storing computer instructions that when executed by the controller, causes the controller to:
transmit relevant session information to an authorized mediation device in response to determining that a tracking request is made by an authorized mediation device by comparing the authorized mediation device with a list of authorized mediation devices, wherein the relevant session information is associated with a targeted user among users of a network and is retrieved from stored session information of the users based on the tracking request, transmitting a flat file to the mediation device in response to a plurality of queries at a configurable interval from the mediation device and wherein the relevant session information is stored in the flat file associated with the targeted user.

18. The network device of claim 17, wherein the controller is adapted to transmit the flat file to the authorized mediation device and wherein the relevant session information is an IP address and at least one among an access attempt, an access accept, an access failed, and an access session end.

19. A method, comprising:
obtaining session information from a user information server, the session information being associated with users of a network;
receiving a tracking request from a mediation device for a targeted user among the users of the network;
determining if the tracking request came from an authorized mediation device by comparing the mediation device with a list of authorized mediation devices;
if the tracking request came from the authorized mediation device, then selecting relevant session information from the session information, the relevant session information being associated with the targeted user and being selected based at least on user identification information in the tracking request;
storing the relevant session information in a flat file; and
transmitting a portion of the relevant session information in the flat file to a mediation device in response to a plurality of queries at a configurable interval from the mediation device.

20. The method of claim 19, wherein the relevant session information is at least one among an IP address, an access attempt, an access accept, an access failed, or an access session end.

21. The method of claim 19, wherein the user information server is a Remote Authentication Dial In User Service server.

22. The method of claim 21, comprising transmitting the flat file to the authorized mediation device in response to a query from the authorized mediation device.

* * * * *